United States Patent
Yeh et al.

(10) Patent No.: US 7,926,780 B2
(45) Date of Patent: Apr. 19, 2011

(54) VIBRATION DAMPENING STRUCTURE FOR ELECTRONIC DEVICE

(75) Inventors: Chin-Wen Yeh, Taipei Hsien (TW); Zhen-Neng Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 847 days.

(21) Appl. No.: 11/858,133

(22) Filed: Sep. 20, 2007

(65) Prior Publication Data
US 2009/0057525 A1     Mar. 5, 2009

(30) Foreign Application Priority Data
Aug. 30, 2007   (CN) .................. 2007 2 0200916 U (51) Int. Cl.
*F16M 13/00*   (2006.01)
*G06F 1/16*   (2006.01)
(52) U.S. Cl. ... 248/632; 248/635; 248/636; 361/679.34; 411/103
(58) Field of Classification Search ............... 248/539, 248/559, 632, 635, 636, 638, 633, 634, 27.3; 361/679.34, 679.35, 679.36, 685; 381/388, 381/333, 386; 411/41, 55, 103, 111, 508
See application file for complete search history.

(56) References Cited

U.S. PATENT DOCUMENTS

| | | | | |
|---|---|---|---|---|
| 5,366,200 A | * | 11/1994 | Scura | 248/632 |
| 5,761,031 A | * | 6/1998 | Ajmani | 361/679.34 |
| 6,744,903 B1 | * | 6/2004 | Jeon | 381/388 |
| 6,760,460 B1 | * | 7/2004 | Jeon | 381/388 |
| 6,917,520 B2 | * | 7/2005 | Lin et al. | 361/679.35 |
| 7,073,624 B2 | * | 7/2006 | Decanio et al. | 181/150 |
| 7,137,767 B2 | * | 11/2006 | Franke et al. | 411/401 |
| 7,639,490 B2 | * | 12/2009 | Qin et al. | 361/679.34 |
| 2006/0023416 A1 | * | 2/2006 | Chen | 361/685 |
| 2008/0017778 A1 | * | 1/2008 | Fan et al. | 248/539 |

\* cited by examiner

*Primary Examiner* — Tan Le
(74) *Attorney, Agent, or Firm* — Frank R. Niranjan (57) ABSTRACT

A vibration dampening structure (10) for absorbing vibrations generated by an electronic device includes a screw (30) and a dampening element (50) placed around the screw. The screw includes a head (31) and a shank (32) extending from the head. A retaining slot is defined in the shank. The dampening element includes a resilient shock-absorbing member (53) fittingly surrounding the shank of the screw. At least one resilient hook (515) protrudes from a first end of the resilient shock-absorbing member and engages in the retaining slot of the screw. A plurality of shock-absorbing pads (531) protrudes from a second end of the resilient shock-absorbing member opposite to the first end. The shock-absorbing pads are configured for abutting on the electronic device.

2 Claims, 8 Drawing Sheets

VIBRATION DAMPENING STRUCTURE FOR ELECTRONIC DEVICE

BACKGROUND

1. Field of the Invention

The present invention relates to vibration dampening structures, and more particularly to a vibration dampening structure for an electronic device, such as a data storage device, etc.

2. Description of Related Art

Electronic devices, such as various data storage devices (for example, hard disk drives and floppy disk drives), are usually installed in a computer for communicating and handling data. When the data storage device is running, vibrations will be generated therefrom and may damage the data storage device. It is important to secure the data storage device stably in the computer for keeping stability and security of the computer.

Conventionally, the data storage device is secured in the computer by a plurality of methods. For example, data storage devices are screwed in mounting brackets of computers. However, gaps unavoidably exist between the screws and sides of the screw holes of the data storage device, thereby allowing vibrations when the data storage device is running, which can effect stability of the data storage device.

What is needed, therefore, is a convenient simple vibration dampening structure for use in an electronic device.

SUMMARY

A vibration dampening structure for absorbing vibrations generated by an electronic device includes a screw and a dampening element placed around the screw. The screw includes a head and a shank extending from the head. A retaining slot is defined in the shank. The dampening element includes a resilient shock-absorbing member fittingly surrounding the shank. At least one resilient hook protrudes from a first end of the resilient shock-absorbing member and engages in the retaining slot of the screw. A plurality of shock-absorbing pads protrudes from a second end of the resilient shock-absorbing member opposite to the first end. The shock-absorbing pads are configured for abutting on the electronic device.

Other advantages and novel features of the present invention will become more apparent from the following detailed description of an embodiment when taken in conjunction with the accompanying drawings, in which:

DETAILED DESCRIPTION

Figure 1:
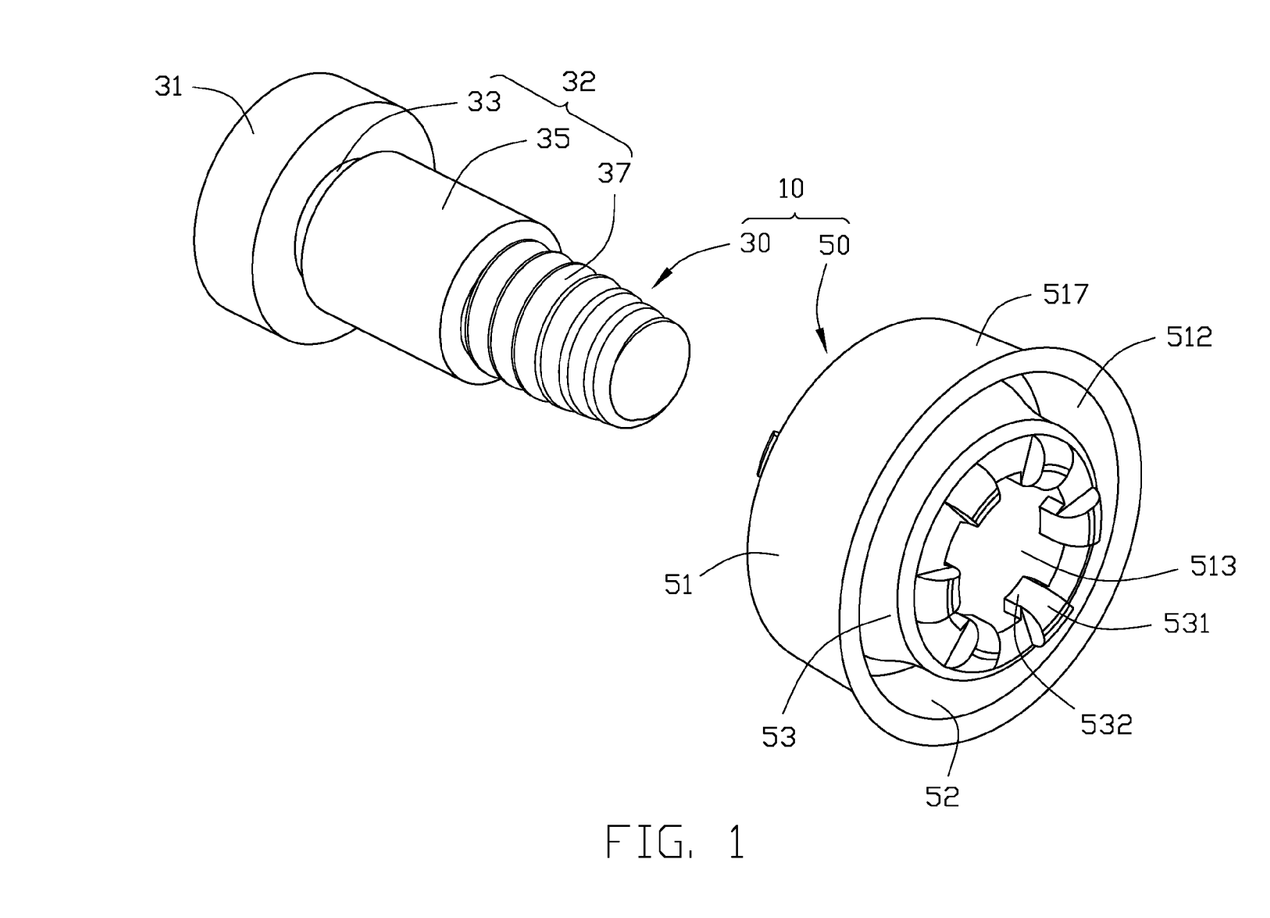
FIG. 1 is an exploded, isometric view of a vibration dampening structure in accordance with an embodiment of the present invention.
Figure 2:
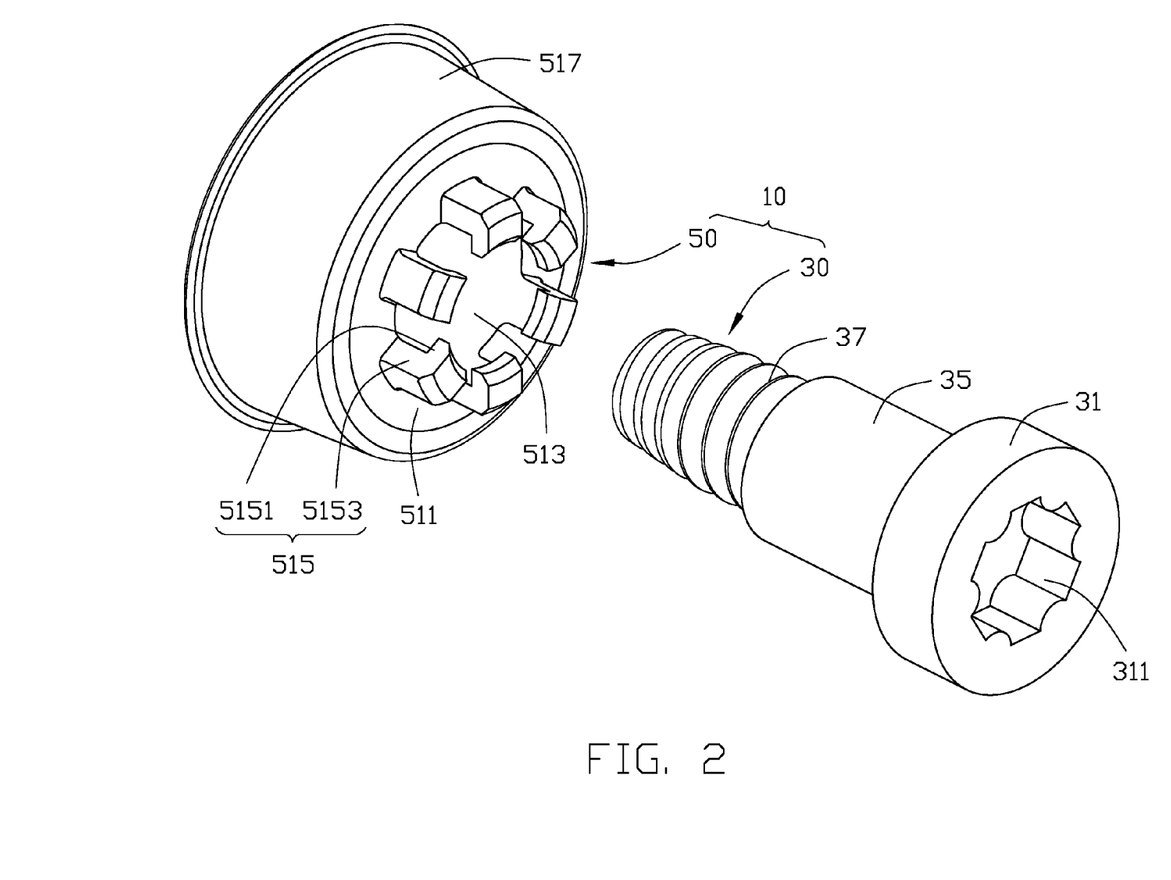
FIG. 2 is similar to FIG. 1, but viewed from another aspect.
Figure 3:
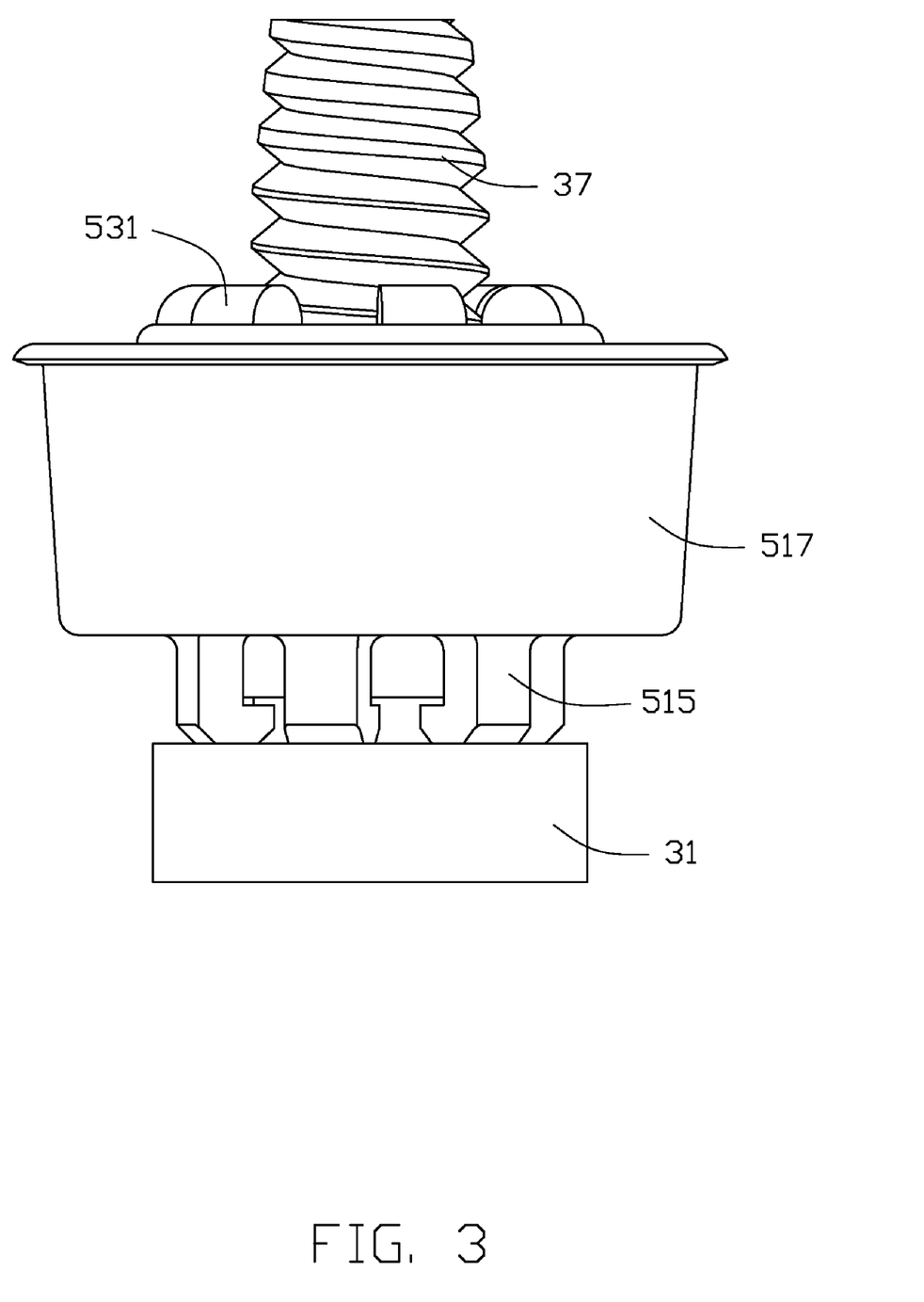
FIG. 3 is a front elevational view of the vibration dampening structure.
Figure 4:
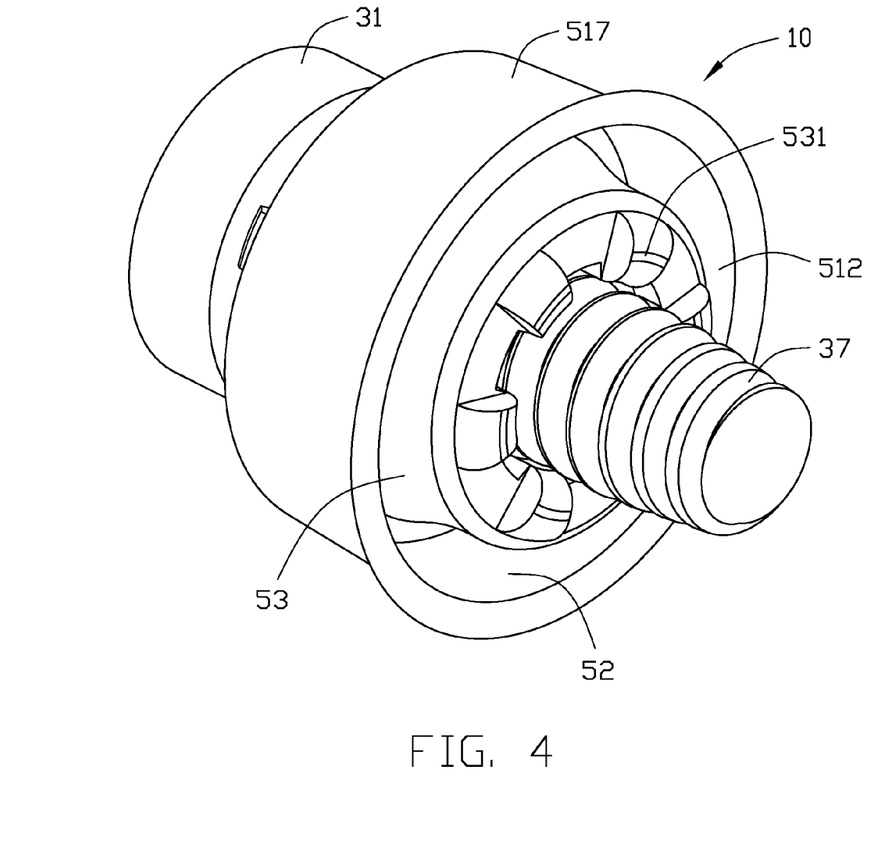
FIG. 4 is an assembled view of the vibration dampening structure of FIG. 1.
Figure 5:
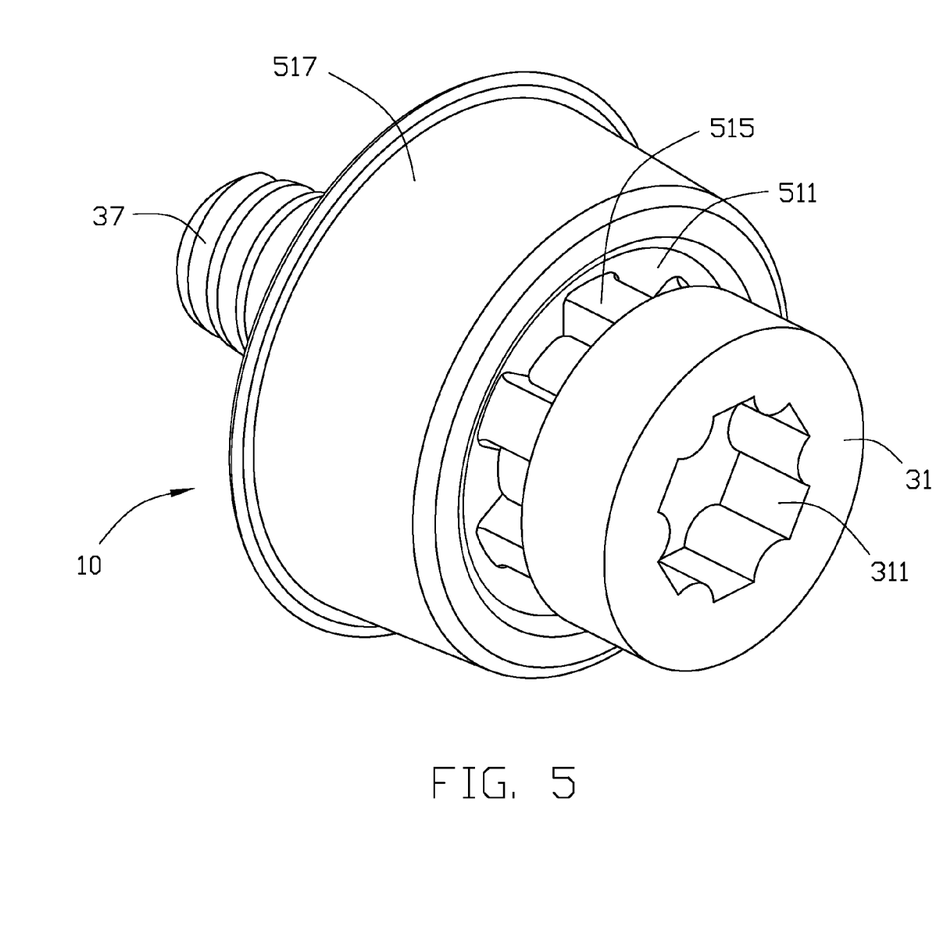
FIG. 5 is similar to FIG. 4, but viewed from another aspect.

Referring to FIGS. 1 and 2, a vibration dampening structure 10 of an embodiment of the present invention includes a screw 30 and a dampening element 50 placed around the screw 30.

The screw 30 includes a head 31 defining a recess 311 therein and a shank 32 extending perpendicularly from the head 31. The shank 32 includes a connecting portion 33 connected to the head 31, a shaft portion 35 connected to the connecting portion 33, and a threaded portion 37 connected to the shaft portion 35. The connecting portion 33 is located between the head 31 and the shaft portion 35, and a diameter of the connecting portion 33 is less than diameters of the head 31 and the shaft portion 35, thereby forming a ring-shaped retaining slot between the head 31 and the shaft portion 35.

Figure 6:
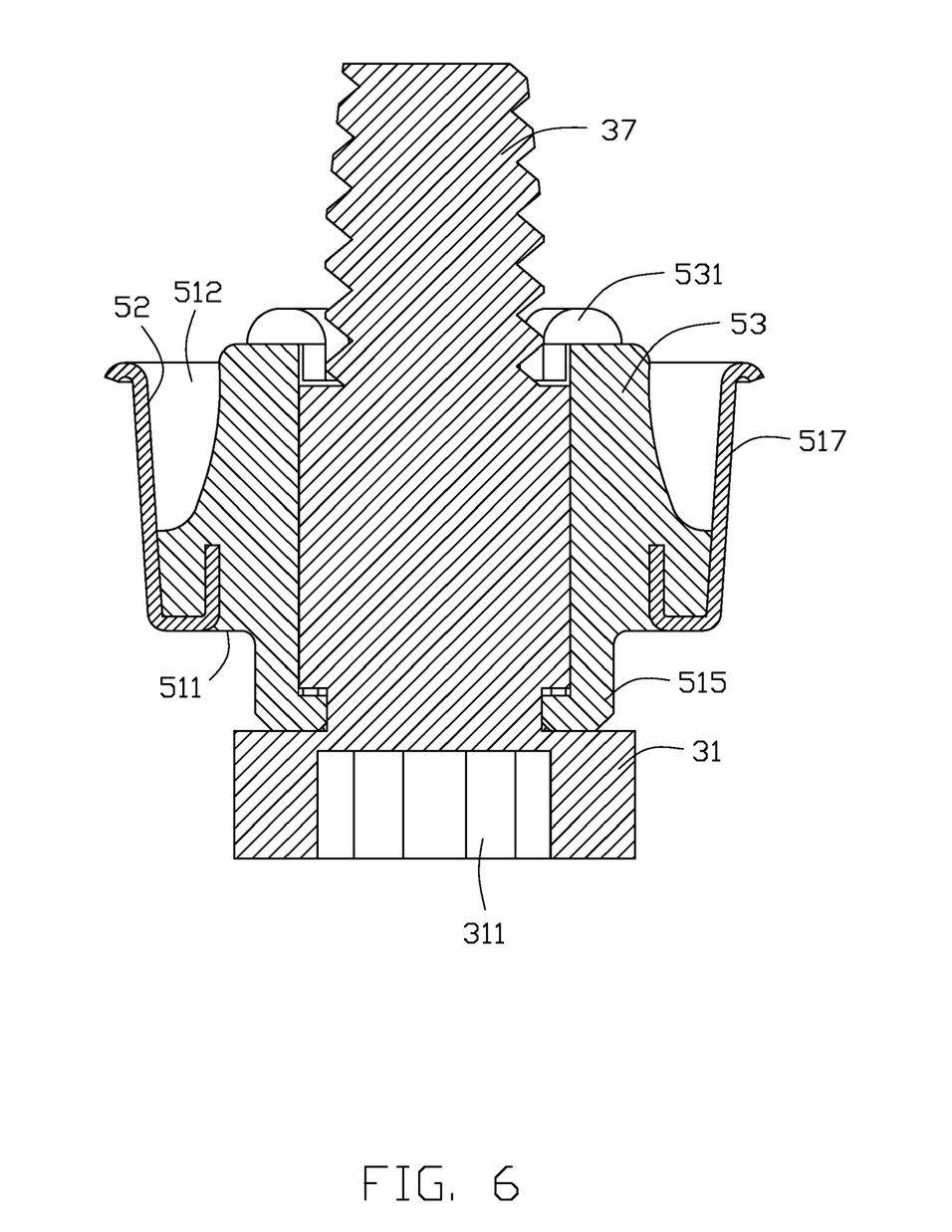
FIG. 6 is a sectional view of the vibration dampening structure.

The dampening element 50 includes a resilient shock-absorbing member 53 and a bowl-shaped enclosure 51 enclosing the resilient shock-absorbing member 53 therein. The resilient shock-absorbing member 53 has a top wall 511, and a top portion of the enclosure 51 is embedded in borders of the top wall 511 of the resilient shock-absorbing member 53, thereby the enclosure 51 being integrally formed with the resilient shock-absorbing member 53. The enclosure 51 has a circular body 517 extending from edges of the top portion thereof and an opening 512 defined in a bottom portion thereof for the resilient shock-absorbing member 53 extending therethrough. The diameter of the body 517 increases gradually from the top portion to the opening 512 of the bottom portion of the enclosure 51. A through hole 513 is defined in the center of the top wall 511 of the resilient shock-absorbing member 53 and runs through the resilient shock-absorbing member 53. The diameter of the through hole 513 is the same as that of the shaft portion 35 of the screw 30. A plurality of resilient hooks 515 protrudes from the top wall 511 around the through hole 513 of the resilient shock-absorbing member 53. Each resilient hook 515 includes a supporting portion 5153 extending from the top wall 511 and a clasp 5151 bent perpendicularly from a free end of the supporting portion 5153. A width of each clasp 5151 is equal to a vertical distance of outer surfaces between the shaft portion 35 and the connecting portion 33, a height of each clasp 5151 is equal to a distance from the head 31 to the shaft portion 35, thereby the clasp 5151 of each resilient hook 515 is secured in the retaining slot formed between the head 31 and the shaft portion 35 of the screw 30. The body 517 of the enclosure 51 has an inner surface 52. The resilient shock-absorbing member 53 is in the shape of a tapered tube with the wide end (referring also to FIG. 6) abutting the inner surface 52 of the body 517, and the narrow end exposed outside of the opening 512 of the enclosure 51. Space is left between the enclosure 51 and the shock-absorbing member 53 of the dampening element 50. A plurality of shock-absorbing pads 531 protrudes from the bottom edges around the through hole 513 of the resilient shock-absorbing member 53 to be exposed outside of the opening 512. The plurality of shock-absorbing pads 531 extend into the through hole 513. Each shock-absorbing pad 531 has a protruding block 532 extending from an end thereof to an inner surface of the through hole 513, and each protruding block 532 abuts on the threaded portion 37 of the screw 30.

Referring to FIGS. 3 to 6, in assembly, the screw 30 is inserted into the through hole 513 of the dampening element 50 from the top portion thereof to force the resilient hooks 515 of the dampening element 50 to deform elastically away from the screw 30. When the clasps 5151 of the resilient hooks 515 are coplanar with the connecting portion 33 of the screw 30, the resilient hooks 515 will rebound back to their initial states to be clasped in the retaining slot formed between the head 31 and the shaft portion 35 of the screw 30. Thereby preventing the dampening element 50 moving radially or axially along the screw 30. At this time, the inner surface of the through hole 513 abuts against the outer surface of the shaft portion 35 of the screw 30, and the ends of the shock-absorbing pads 531 of the resilient shock-absorbing member 53 and the corresponding protruding blocks 532 abut the threaded portion 37 adjacent to the shaft portion 35 of the screw 30. Thereby securing the dampening element 50 onto the screw 30, and composing the vibration dampening structure 10.

Figure 7:
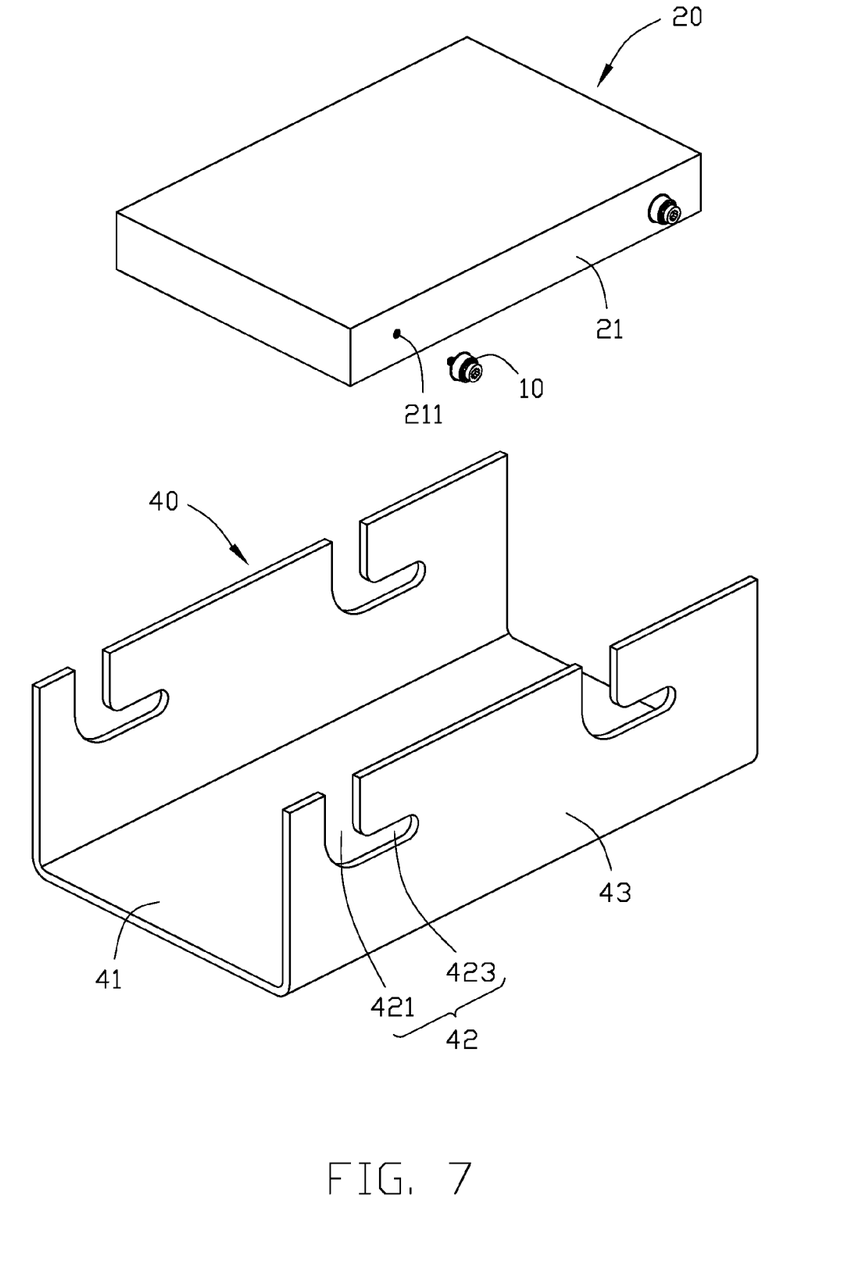
FIG. 7 is an exploded, isometric view of the vibration dampening structure with a data storage device and a mounting bracket.
Figure 8:
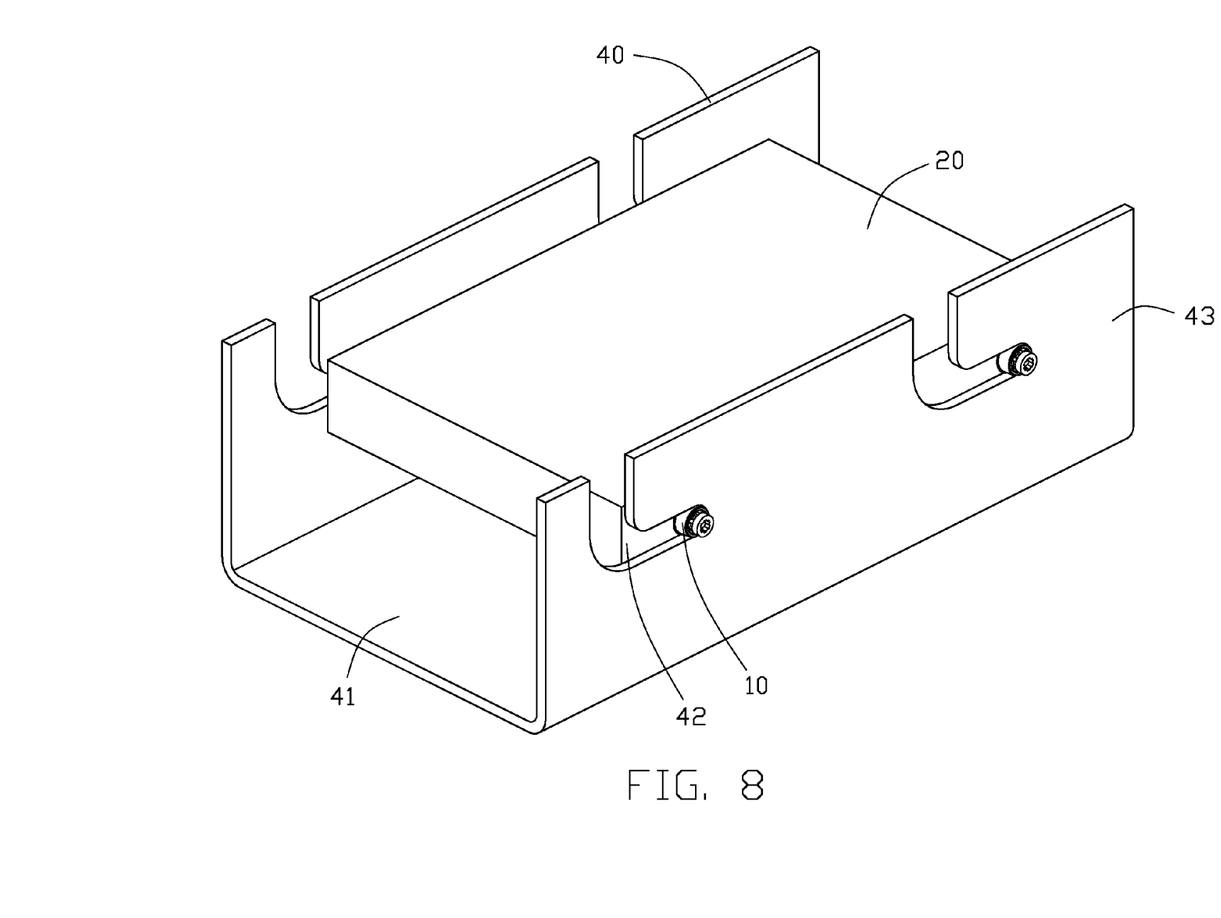
FIG. 8 is an assembled view of the vibration dampening structure with the data storage device and the mounting bracket of FIG. 7.

Referring to FIGS. 7 and 8, the vibration dampening structure 10 of the present invention can be installed on an electronic device for absorbing vibration when the electronic device is running. For example, the vibration dampening structure 10 is installed on a data storage device 20, and then the data storage device 20 is secured in a mounting bracket 40. The data storage device 20 includes two opposite sidewalls 21, each sidewall 21 defines two screw holes 211. The mounting bracket 40 includes a bottom panel 41, and two side panels 43 extending perpendicularly from two opposite sides of the bottom panel 41. Each side panel 43 defines an L-shaped securing slot 42, each securing slot 42 includes a guide portion 421 perpendicular to the bottom panel 41 and a securing portion 423 parallel to the bottom panel. A width of each guide portion 421 is larger than a diameter of the enclosure 51 of the dampening element 50, and a width of each securing portion 423 is equal to the diameter of the enclosure 51. In assembly, the vibration dampening structures 10 are respectively secured into the screw holes 211 of the data storage device 20, and the shock-absorbing pads 531 of each vibration dampening structure 10 abut against the sidewall 21 of the data storage device 20. The data storage device 20 with the vibration dampening structures 10 thereon is pushed towards the bottom panel 41 of the mounting bracket 40 to drive the enclosures 51 of each vibration dampening structure 10 to slide through the guide portions 421 of the corresponding securing slots 42, and then the data storage device 20 is pushed parallel to the bottom panel 41 to drive the vibration dampening structures 10 to be secured into the securing portions 423 of the corresponding securing slots 42. When the data storage device 20 is running, the vibration generated by the data storage device 20 will be absorbed by the vibration dampening structures 10 because of the shock-absorbing pads 531 of the vibration dampening structures 10 engaging with the sidewalls 21 of the data storage device 20. In this embodiment, the enclosure 51 of the vibration dampening structure 10 is made of a durable material, such as a metal, for preventing the enclosure 51 being abraded when the enclosure 51 slides into the securing slot 42.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration dampening structure for absorbing vibrations generated by an electronic device, comprising:
    a screw comprising a head, a shank extending from the head, and a retaining slot defined in the shank; and
    a dampening element placed around the screw, the dampening element comprising a resilient shock-absorbing member fittingly surrounding the shank of the screw, at least one resilient hook protruding from a first end of the resilient shock-absorbing member and engaging in the retaining slot of the screw, a plurality of shock-absorbing pads protruding from a second end of the resilient shock-absorbing member opposite to the first end, the shock-absorbing pads being configured for abutting on the electronic device;
    wherein the dampening element further comprises an enclosure enclosing the resilient shock-absorbing member, the resilient shock-absorbing member has a top wall, the enclosure having an end portion embedded in the top wall of the resilient shock-absorbing member for being integrally formed with the resilient shock-absorbing member; the resilient shock-absorbing member is tube-shaped with a through hole running therethrough, the shock-absorbing pads are located around the through hole to be exposed outside of the enclosure away from the top wall of the resilient shock-absorbing member; each shock-absorbing pad has a protruding block at an end thereof, the protruding blocks extending in an axial direction with respect to the shank and surrounding the shank; the shank comprises a connecting portion connected to the head, a threaded portion and a shaft portion located between the connecting portion and the threaded portion, a diameter of the connecting portion is less than diameters of the head and the shaft portion, the retaining slot is ring-shaped and formed between the head and the shaft portion; the at least one resilient hook comprises a plurality of resilient hooks, each resilient hook comprises a supporting portion extending perpendicularly from the top wall of the resilient shock-absorbing member and a clasp bending perpendicularly from a free end of the supporting portion, the clasps of the resilient hooks are respectively engaged in the retaining slot of the screw; and the width of each clasp is equal to the vertical distance between outer surfaces of the shaft portion and the connecting portion of the screw, and the height of each clasp is equal to a distance from the head to the shaft portion of the screw.

2. A vibration dampening structure for absorbing a vibration generated from an electronic device, comprising:
    a screw comprising a head and a shank extending from the head, the shank having a threaded portion; and
    a dampening element having a through hole running therethrough, for the shank inserting therein, the dampening element comprising a resilient shock-absorbing member surrounding the shank of the screw, a plurality of shock-absorbing pads protruding from the resilient shock-absorbing member and extending into the through hole thereof, the plurality of shock-absorbing pads surrounding the threaded portion of the screw and abutting thereon, the shock-absorbing pads being configured for contacting with the electronic device;
    wherein a retaining slot is defined in the shank, the dampening element protruding at least one resilient hook to engage in the retaining slot for preventing the dampening element moving axially along the screw; the dampening element further comprises an enclosure enclosing the resilient shock-absorbing member, the resilient shock-absorbing member has a top wall, the enclosure is embedded in the top wall of the resilient shock-absorbing member for being integrally formed with the resilient shock-absorbing member; the shank further comprises a connecting portion connected to the head and a shaft portion located between the connecting portion and the threaded portion, the diameter of the connecting portion is less than diameters of the head and the shaft portion, the retaining slot is ring-shaped and formed between the head and the shaft portion; the at least one resilient hook comprises a plurality of resilient hooks, each resilient hook comprises a supporting portion extending perpendicularly from the top wall of the resilient shock-absorbing member and a clasp bending perpendicularly from a free end of the supporting portion, the clasps of the resilient hooks are respectively engaged in the retaining slot of the screw; and the width of each clasp is equal to the vertical distance between outer surfaces of the shaft portion and the connecting portion of the screw, and the height of each clasp is equal to the distance from the head to the shaft portion of the screw.

* * * * *